United States Patent
Singh Shekhawat et al.

(10) Patent No.: US 11,523,411 B2
(45) Date of Patent: Dec. 6, 2022

(54) METHOD AND SYSTEM FOR RADIO-RESOURCE SCHEDULING IN TELECOMMUNICATION-NETWORK

(71) Applicant: Samsung Electronics Co., Ltd., Suwon-si (KR)

(72) Inventors: Jitender Singh Shekhawat, Bangalore (IN); Rishabh Agrawal, Bangalore (IN); Anshuman Nigam, Bangalore (IN); Konchady Gautam Shenoy, Bangalore (IN); Yash Jain, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 17/301,838

(22) Filed: Apr. 15, 2021

(65) Prior Publication Data
US 2021/0329668 A1    Oct. 21, 2021

(30) Foreign Application Priority Data

Apr. 15, 2020  (IN) .............................. 202041016358
Feb. 23, 2021  (IN) .............................. 202041016358

(51) Int. Cl.
*H04W 72/12*  (2009.01)
*G06N 20/00*  (2019.01)
*H04W 72/04*  (2009.01)

(52) U.S. Cl.
CPC ........ *H04W 72/1263* (2013.01); *G06N 20/00* (2019.01); *H04W 72/0446* (2013.01); *H04W 72/1226* (2013.01); *H04W 72/1242* (2013.01)

(58) Field of Classification Search
CPC ......... H04W 72/1263; H04W 72/0446; H04W 72/1226; H04W 72/1242; G06N 20/00
See application file for complete search history.

(56) References Cited

U.S. PATENT DOCUMENTS 6,347,091 B1    2/2002  Wallentin et al.
7,230,921 B2 *  6/2007  Eriksson ................ H04L 69/16
                                                    370/466

(Continued)

FOREIGN PATENT DOCUMENTS

KR    20010034910 A    4/2001
KR    100412040 B1    12/2003

(Continued)

OTHER PUBLICATIONS

International Search Report and Written Opinion of the International Searching Authority in connection with International Application No. PCT/KR2021/003919 dated Jul. 7, 2021, 8 pages.

*Primary Examiner* — Chandrahas B Patel

(57) ABSTRACT

The present disclosure provides a method for radio-resource scheduling in a telecommunication network. The method comprises selecting at least one objective associated with a radio-resource scheduling from a plurality of objectives; prioritizing at least one flow from a plurality of flows for the selected at least one objective; identifying at least one state parameter from a plurality of state parameters associated with at least one of an active bearers from a plurality of active bearers; inputting at least one of the plurality of state parameters for the at least one of the active bearers to be scheduled during a current transmission time interval (TTI) to a reinforcement machine learning (ML) network, the reinforcement ML network being configured for a reward in accordance with the selected at least one objective; and receiving, from the reinforcement ML network, a radio resource allocation for each of the active bearers for the current TTI.

20 Claims, 19 Drawing Sheets

(56) References Cited

U.S. PATENT DOCUMENTS

| | | | | |
|---|---|---|---|---|
| 7,599,326 B2* | 10/2009 | Watson | .................. | H04W 8/04 |
| | | | | 370/465 |
| 7,623,869 B2* | 11/2009 | Lee | ...................... | H04W 76/15 |
| | | | | 455/452.2 |
| 7,680,478 B2* | 3/2010 | Willars | ............. | H04W 52/0225 |
| | | | | 455/343.5 |
| 10,614,376 B2 | 4/2020 | Gopalan | | |
| 2010/0008224 A1 | 1/2010 | Lyonnet et al. | | |

FOREIGN PATENT DOCUMENTS

| KR | 101571899 B1 | 11/2015 |
|---|---|---|
| KR | 20150132774 A | 11/2015 |

* cited by examiner

METHOD AND SYSTEM FOR RADIO-RESOURCE SCHEDULING IN TELECOMMUNICATION-NETWORK

CROSS-REFERENCE TO RELATED APPLICATIONS

This application is based on and claims priority under 35 U.S.C. § 119 to Indian Provisional Patent Application No. 202041016358, filed on Apr. 15, 2020, and Indian Non-Provisional Patent Application No. 202041016358, filed on Feb. 23, 2021 in the Indian Intellectual Property Office, the disclosure of which is incorporated by reference herein in its entirety.

BACKGROUND

1. Field

The present disclosure relates to telecommunication-network and in particular, relates to radio-resource scheduling.

2. Description of Related Art

Radio resource scheduling is a norm followed in telecommunications for managing data traffic. Radio resource allocation strategies attempt at achieving a balance of the objectives such as maximizing throughput, a desirable-fairness among users, meeting quality of service (QoS) metrics for user flows.

A competent and resourceful communication necessitates a judicious use of system resources. Resources may include frequency bands allocated to user equipment (UEs), which is often divided into physical resource blocks (PRB), as well as time units i.e., service time for a user's application. These resources are generally managed and allocated by a network scheduler based on specified requirements or metrics. Traditionally, schedulers are designed from a low-level perspective. The objectives behind designing such schedulers are primarily to maximize system throughput (max T scheduler), user proportional fairness (PF), quality of service (QoS), and so on. However, the existing design paradigm lacks the flexibility of high-level objective specifications as well as the adaptability to a dynamic environment e.g., 5G technology. It is the task of the scheduler to allocate resources, as far as possible, optimally according to the network objectives.

With the advent of 5G technology, the spectral resources have increased considerably. Although, the spectral resources facilitate communications, the caveat of managing a larger pool of network resources comes with it. Moreover, it is experienced that the latency requirements of 5G communication are significantly more stringent than that of the 4G technology.

Another shortcoming related to the existing schedulers is that these schedulers do not adjust or cope up with the increased load. Albeit a scheduler can be designed to deal with these challenges, there may also exist an issue relating to adaptability. The fifth-generation wireless communication system provides ultra-reliability. The fifth-generation wireless communication system (as illustratively depicted in FIG. 1) is implemented. Further, it has been observed in 5G communications, that the channel and network status may vary rapidly to the point that an allocation strategy by a scheduler, that was optimal initially, may no longer be so later. This would necessitate regular re-designing of objectives which is not always feasible with traditional schedulers.

Existing radio-resource schedulers use heuristics driven strategies that are not adaptive. The performance is generally sub-optimal in varying operating scenarios such as changing radio conditions, changing traffic conditions for flows, changing number of flows etc. The scheduler directly impacts the business by controlling the number of users that can be scheduled while ensuring the QoS requirements of all user-flows are met.

SUMMARY

This summary is provided to introduce a selection of concepts in a simplified format that is further described in the detailed description of the disclosure. This summary is not intended to identify key or essential inventive concepts of the claimed disclosure, nor is it intended for determining the scope of the claimed disclosure.

The present disclosure refers a method for radio-resource scheduling in a telecommunication network. The method comprises selecting at least one objective associated with one radio-resource scheduling from a plurality of objectives; prioritizing at least one flow from a plurality of flows to achieve the selected objective; identifying at least one state parameter from a plurality of state parameters associated with at least one of an active bearer from a plurality of active bearers; inputting at least one of the plurality of state parameters for at least one active bearer to be scheduled during a current transmission time interval (TTI) to a reinforcement machine learning (ML) network, said reinforcement ML network configured for a reward in accordance with the selected at least one objective; and receiving a radio resource allocation for each of the active bearers for the current TTI from the reinforcement ML network.

In other embodiment, the present disclosure refers a method for radio-resource scheduling in a telecommunication network. The method comprises deploying a pre-trained reinforcement ML network at a network node, selecting by a network operator at least one objective associated with one radio-resource scheduling for operating the pre-trained reinforcement ML network, prioritizing at least one flow from a plurality of flows by the network operator to achieve the selected objective, identifying at least one state parameter from a plurality of state parameters associated with at least one of an active bearer from a plurality of active bearers, inputting at least one of the plurality of state parameters for at least one active bearer to be scheduled during a current TTI to the pre-trained reinforcement ML network, and receiving a radio resource allocation for each of the active bearers for the current TTI from the pre-trained reinforcement ML network.

To further clarify the advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
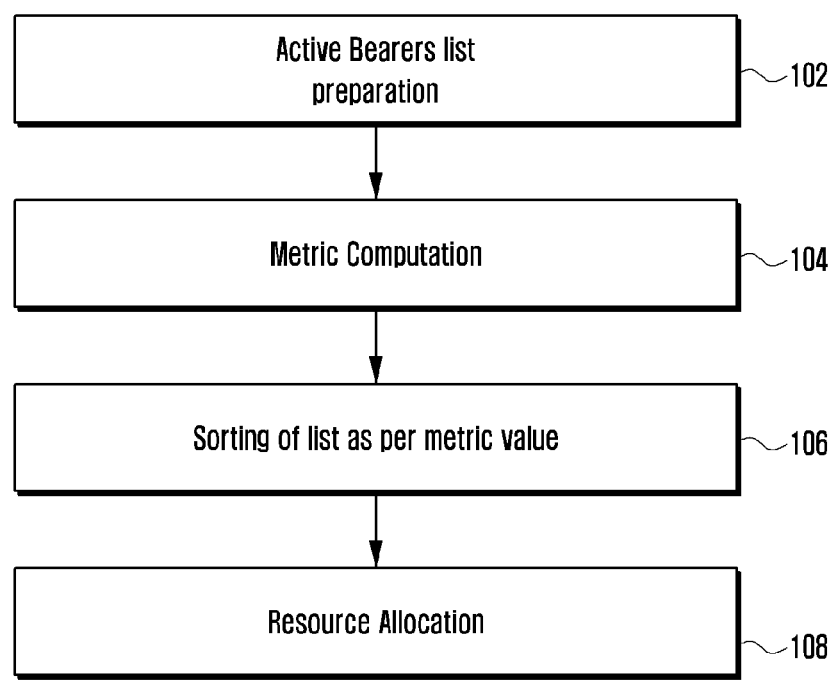
FIG. 1 illustrates a state of the art scenario.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the present disclosure and are not intended to be restrictive thereof.

Reference throughout this specification to "an aspect," "another aspect" or similar language means that a particular feature, structure, or characteristic described in connection with the embodiment is included in at least one embodiment of the present disclosure. Thus, appearances of the phrase "in an embodiment," "in another embodiment" and similar language throughout this specification may, but do not necessarily, all refer to the same embodiment.

The terms "comprises," "comprising," or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting.

Conventional schemes that exist for radio resource scheduling aim at proportional fair schemes (and their variants), maximal throughput scheme, round-robin scheme etc. A state of the art scheduler functionality has been depicted in FIG. 1. in accordance with the following steps:

At step 102, a list of all active bearers is prepared. A list of bearers is created which have data in this transmission time interval (TTI).

At step 104, a metric computation is done for active flows wherein heuristics are static i.e., fixed formula. Each bearer may have a metric value according to the heuristic which is used. In one example, proportional fair (PF), max throughput etc. Examples of metric computation formulas are PF algorithm which are used conventionally.

At step 106, sorted list is prepared as per metric values obtained in step 2. The higher the metric, higher may be the priority to schedule At step 108, actual resource allocation step executes. A list of bearers is prepared which may be scheduled in current TTI. Accordingly, resource blocks (RBs) are allocated to the selected bearers in Step 106 till RBs are exhausted.

Yet, there remains a vital for a dynamically adaptive optimal radio resource allocation.

Figure 2:
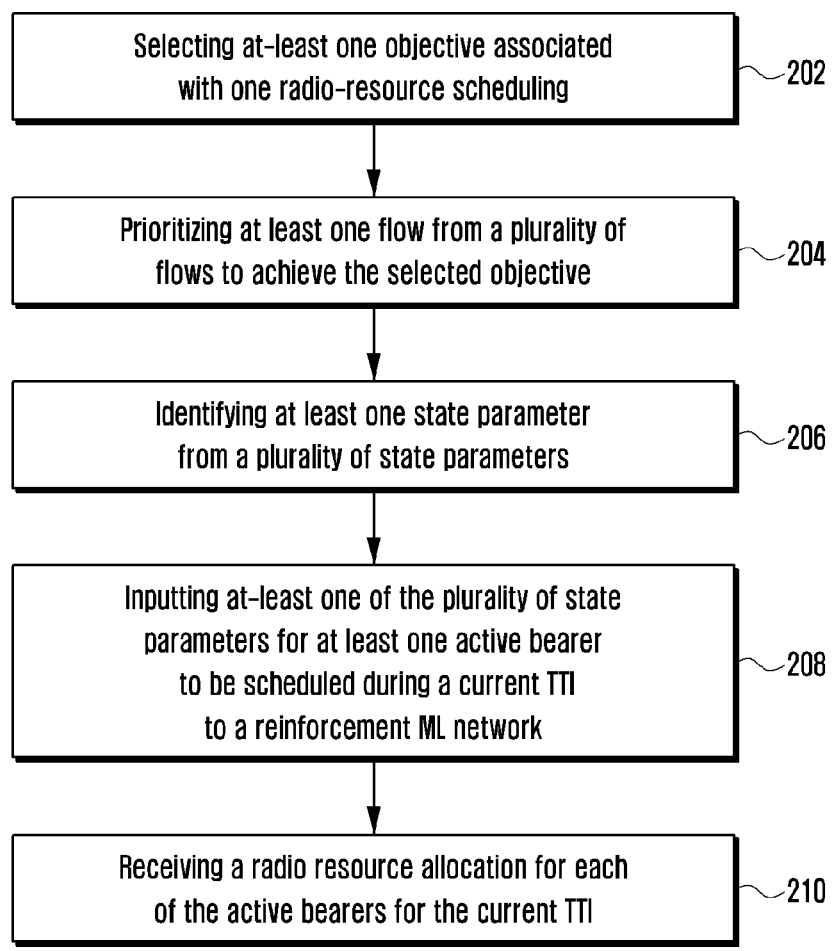
FIG. 2 illustrates method-steps in accordance with the embodiment of the disclosure.

FIG. 2 illustrates method-steps in accordance with the embodiment of the disclosure. The present disclosure refers a method for radio-resource scheduling in a telecommunication network.

The method comprises selecting (step 202) at least one objective associated with one radio-resource scheduling from a plurality of objectives. In an embodiment, the selection of the objective corresponds to the selection of a reward function associated with the reinforcement ML network, said selection achieved by one or more tunable parameters governing selection of a plurality of reward functions.

The method further comprises prioritizing (step 204) at least one flow from a plurality of flows to achieve the selected objective. The one or more selected flow of the network traffic considered for prioritization corresponds to an active flow.

The method further comprises identifying (step 206) at least one state parameter from a plurality of state parameters associated with at least one of active bearers from a plurality of active bearers. The state parameters corresponding to network parameters comprising one or more of system throughput, user fairness, QoS conformance, total transmission power, maximum achievable transmission rate, past average throughput, queue length, head-of-line delay, packet loss ratio etc. The state parameters are computed from the network parameters of the active bearers to be scheduled in the TTI for enabling a training of the reinforcement ML network.

The method further comprises inputting (step 208) at least one of the plurality of state parameters for at least one active bearer to be scheduled during a current TTI to a reinforcement ML network, said reinforcement ML network configured for a reward in accordance with the selected at least one objective. The inputting of the state parameters comprises passing the state parameters of the active bearers to be scheduled in the current TTI to the reinforcement ML network. The reinforcement ML network is configured for training in accordance with the selected objective and optionally the prioritization based on inputting the identified state parameters for the active bearer acting as a training dataset.

The plurality of reward functions is defined by at least one of: a) throughput and fairness with variable proportions; b) maximizing throughput and minimizing packet loss ratio (PLR); c) maximizing throughput and minimizing delay; d) minimized delay; e) minimized PLR; or f) maximum throughput.

In an example, the training of the reinforcement ML network is performed in accordance with the selected objective, prioritization and the selected state parameter for n number of TTI' s. The training of the reinforcement ML network causes output of a probability of scheduling of each of the selected bearer in the TTI in accordance with a state computed from the state parameters.

In an example, the reinforcement ML network is artificial neural network (ANN) based deep learning network configured to handle a variation of users with every TTI, said ANN being independent of a number of users and configured to compute scheduling probability for number of users irrespective of variation in the number of users. The training of reinforcement ML network is based on one or more of: a) variance reduction technique; b) time-dependency; c) scalability with the number of users; or d) a training conducted for a fixed-ratio of different traffic flows and a further evaluation of the trained reinforcement ML network on different ratios than the fixed ratios.

Once trained, the trained reinforcement ML network may be deployed at a network node for execution of the scheduling. Optionally, training of the deployed ML network may be continued on the network node based on evaluation of performance of the deployed ML network.

In an example, the training of reinforcement ML network is defined by a real-time learning in a virtualized radio access network (vRAN) system. The real-time learning is defined by configuring the reinforcement ML network in parallel into one or more graphic processing unit (GPU)'s present in control unit CU, digital unit (DU) and radio unit (RU) within the vRAN system. Thereafter, multiple cells data is collated based on monitoring the multiple cells for scheduling of resources in neighboring cells to achieve a multi-cell scheduling on the vRAN system. Likewise, the reinforcement ML network may be construed to be implemented as a part of cloud RAN (cRAN) and open RAN (oRAN).

The method further comprises receiving (step 210) a radio resource allocation for each of the active bearers for the current TTI from the reinforcement ML network. The radio resource allocation corresponds to the selection for the active bearers to be scheduled in the current TTI by a Markov decision process (MDP) in a cellular environment for the active bearers. In an example, receiving the radio resource allocation from the pre-trained reinforcement ML network comprises computing an allocation of resource bits in accordance with the network parameters and the objective selected by the network operator. Thereafter, resource bits are allocated by an MDP in a cellular environment for the active bearer.

In an implementation, the method for radio-resource scheduling in a telecommunication network comprises deploying a pre-trained reinforcement ML network at a network node. A network operator selects at least one objective associated with one radio-resource scheduling for operating the pre-trained reinforcement ML network. At least one flow from a plurality of flows is prioritized by the network operator to achieve the selected objective. At least one state parameter is identified from a plurality of state parameters associated with at least one of active bearers from a plurality of active bearers. At least one of the plurality of state parameters for at least one active bearer to be scheduled is inputted during a current TTI to the pre-trained reinforcement ML network. Accordingly, a radio resource allocation is received for each of the active bearers for the cur deploying a pre-trained reinforcement ML network at a network node.

In another example, upon deployment of the pretrained network, the method comprises automatically identifying at least one of a plurality of bearers in relation to a specific TTI and automatically identifying at least one of network parameters associated with the bearers. Thereafter, the pre-trained reinforcement ML network analyses the network parameters and the associated bearers. A network operator selects at least one objective associated with one radio-resource scheduling for operating the pre-trained reinforcement ML network. At least one flow is prioritized from a plurality of flows by the network operator to achieve the selected objective. At least one of the plurality of state parameters is inputted for at least one active bearer to be scheduled during a current TTI to the pre-trained reinforcement ML network. A radio resource allocation is received for each of the active bearers for the current TTI from the pre-trained reinforcement ML network.

Figure 3:
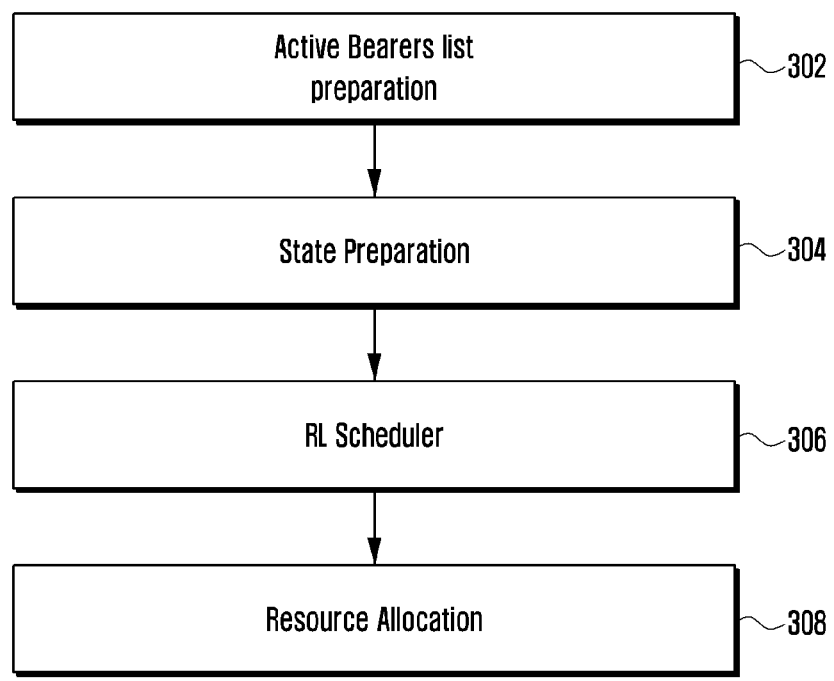
FIG. 3 illustrates a scheduler functionality (RL) in accordance with an embodiment of the present disclosure.

FIG. 3 illustrates a scheduler functionality (RL) in accordance with an embodiment of the present disclosure and corresponds to method steps of FIG. 2.

Step 302 corresponds to step 202 and refers preparation of a list of all active-bearers that have data in current TTI. Also, an objective is captured in reward. Identification of the reward function is executed from a set of reward functions based on desired objectives wherein the desired objectives are throughput, delay, packet loss ratio (PLR).

In an example,
a) Objective is throughput only: $R_t=T$;
b) Objective is throughput and fairness: $R_t=T^{531} *F^{1-\epsilon}$, where $\epsilon$ is a tunable parameter;
c) Objective is throughput, delay, and PLR:

$$R_t = \frac{T}{\min(B, TB)} - Rd - 10*Rl$$

$$R_l = p_1 * l_1 + p_2 * l_2,$$

wherein, traffic priorities are $p_1$ and $p_2$ for flow1 and flow2, respectively, and flow 1 may be VoIP and flow2 may be video;

d) Objective is throughput, delay, PLR, and fairness:

$$R_t = \frac{T}{\min(B, TB)} - Rd - 10*Rl$$

$$R_l = p_1 * l_1 + p_2 * l_2,$$

wherein traffic priorities are p1 and p2 for flow1 and flow2, respectively, and flow1 is VoIP and flow2 is video As a part of training phase, a configuration of the tuning parameters/coefficients of the reward function is based on the desirable balance of the said desired objectives. In an example, consider example 2 in Step 1:

$\epsilon=0.5$: this may have an equal trade-off between throughput and fairness;
$\epsilon=0.8$: this may generate heavy throughput oriented objective compared to fairness;
$\epsilon=0.2$: this may generate heavy fairness oriented objective compared to throughput.

In an example, assuming flow1 is VoIP and flow2 is video, respectively, wherein
$P_1=5$ and $P_2=1$ in step 1, ex number $3^{rd}$;
$P_1=1$ and $P_2=5$ in step 1, ex number $3^{rd}$; and
$P_1=1$ and $P_2=2$ in step 1, ex number $3^{rd}$.

An example list of reward functions is provided as shown below.
a. List of all possible reward functions.
   i. General Reward Function:

$$\mathcal{R} = a\mathcal{R}_T - b\mathcal{R}_d - c\mathcal{R}_l$$

where a, b, c>=0. $R_{TF}$ is the reward function incorporating throughput as well as fairness, $R_D$ is the penalty for delay and $R_{PLR}$ is the penalty for dropping packets.

ii. First Reward Function (Throughput—Delay-PLR) (No Fairness)

$$\mathcal{R} = T/\min(B_i, TB) - \mathcal{R}_d - 10\mathcal{R}_i,$$

$$\mathcal{R}_d = \sum_{i=0}^{n} D_i/D_{max,i},$$

$$\mathcal{R}_i = \sum_{i=0}^{n} p_i l_i,$$

iii. Second Reward Function (Above plus Fairness)

$$\mathcal{R} = TF/\min(B_i, TB) - \mathcal{R}_d - 10\mathcal{R}_t.$$

iv. Throughput only:
      Obtained by setting a=1, other coefficients 0. Removing F from the expression for $R_{TF}$.
   v. Fairness only:
      Obtained by setting a=1, other coefficients 0. Removing T from the expression for $R_{TF}$.
   vi. Throughput and Fairness only:
      Set a=1. Other coefficients equal to 0.
      Hence, $R=T^{\alpha}F^{1-\alpha}$ is used as a reward function where $\alpha>0$ denotes the priority for throughput.
   vii. Delay only:
      Set b=1. Other coefficients equal to 0.
   viii. PLR only:
      Set c=1. Other coefficients equal to 0.
      Other cases are dealt with in a similar fashion.

Multiple reward functions may be utilized. Each reward function may be suitable for a particular combination of objectives as mentioned above.

Step 304 corresponds to steps 204, 206 and refers state-preparation scenario wherein state preparation is done per active flow. State is composed of parameters such as CQI, delay etc. Computation of the state of each active bearer is executed wherein the state comprises of (CQI, delay etc.). The state for active flow i & i varies from 1 to maximum_active_flows in the given TTI.

Example state parameters may be referred as system throughput, user fairness, QoS conformance, total transmission power, maximum achievable transmission rate, past average throughput, queue length, head-of-line delay, packet loss ratio (PLR). One or more of the combinations of above state parameters (Si) may be considered based on radio conditions, system consideration configuration, past scheduler performance etc.

In an example, step 304 refers an environment-initialization and defined by one or more of following:
a) channel model, UE's mobility model, Traffic characteristics are part of scheduler (cellular) environment;
b) environment is initialized according to the environment parameters;
c) UEs(Ut) may be assigned a random position in cell area;
d) traffic is created for each UE according to the traffic parameters;
e) single cell is created which has B resource blocks (RBs) to be assigned every TTI; or
f) each flow (e.g., UE) is characterized with QoS parameters (delay, PLR).

Step 306 refers operation of RL Scheduler and corresponds to step 208. RL scheduler which is represented by neural-network decides whom to allocate resources. Neural net (NN) represents a policy function, while output is the list of bearers which may be scheduled.

Overall, the present state refers to feeding the state for each bearer to an RL agent wherein the RL agent is comprised of a NN. The RL agent refers a policy that tells what action to take given the state, such that policy is represented by NN. Hence, the RL agent is a NN which given the state outputs a list of flows to be scheduled. Each Si, which was computed in step 304, is fed to NN one by one. NN renders a probability pi for each Si which tells the probability with which the flow i has to be scheduled. RL agent may sample from the distribution given by probabilities pi and generate the output list of chosen active flows to be scheduled.

As may be understood, the RL refers decision making agent that has to decide to allocate B RBs to Ut users at every TTI t. Cellular environment resource allocation is treated as MDP. Agent has to be designed to find optimal policy to satisfy QoS. The agent is trained according to policy gradient algorithm of reinforcement learning (RL). Such PG algorithm maximizes the reward obtained during the trajectory. Further, reward has to be designed according to QoS objective as selected in step 302.

As a part of the training of the policy gradient algorithm, curriculum learning is used. In other words, RL agent is trained initially for shorter episodes and then episode-length is increased slowly. In an example, variance reduction technique (time-dependent baseline) may be applied. As a part of learned policy characteristics, the policy is scalable with the number of users i.e., training is done for x users and evaluated till y(>x) users. Training is done for a fixed ratio of different traffic flows but was evaluated on different ratios.

The present step 306 is repeated till the completion of a training time, for example of 10000 TTI's. Once the RL agent is sufficiently trained, the RL agent is now deployed online.

As a part of the testing phase, the trained model is stored in the previous step. State preparation is done for every active flow for the given TTI. Give the state as an input to Neural Network. RL agent is represented by NN. For every TTI, the RL agent provides the output-list. Output list is a list of bearers which is scheduled for that TTI.

Step 308 pertains to actual resource-allocation and corresponds to step 210. RBs may be allocated to the selected bearers in Step 206. In an example, MDP model for Scheduler MDP consists of State S, Action At and Reward Rt. Queue length is normalized by max TB size and can achieve maximum value as 2. A head of line (HOL) delay is normalized by a maximum delay supported by QoS. Reward is designed to incorporate priority-based scheduling as different flows lie in different QoS class.

Figure 4A:
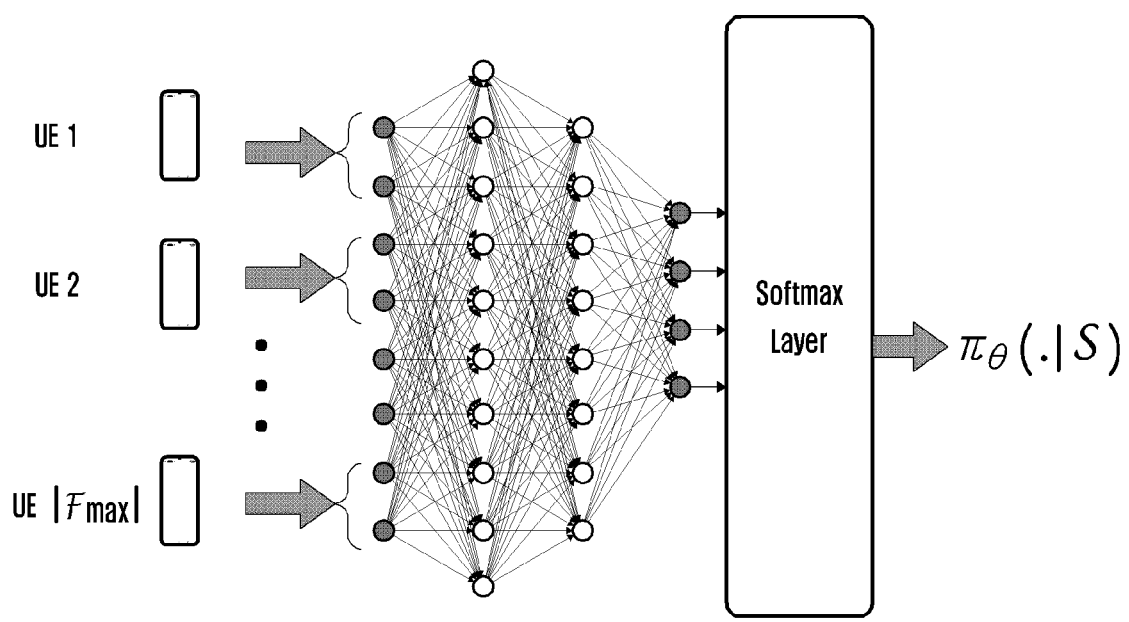
FIGS. 4A and 4B illustrate a neural-network architecture as a part of implementing the RL agent in accordance with an embodiment of the present disclosure.
Figure 4B:
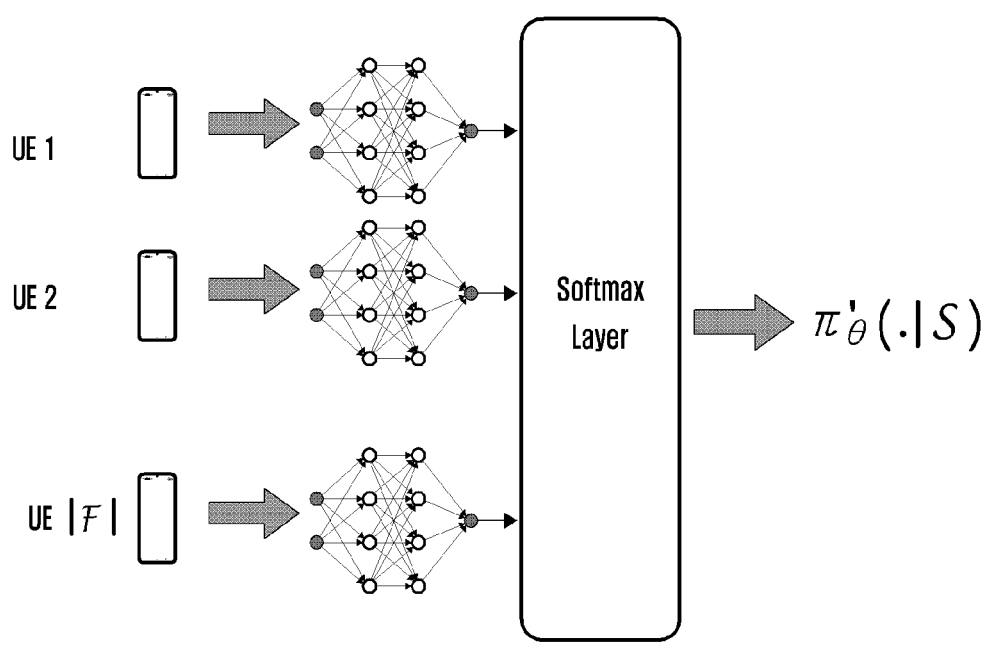

FIGS. 4A and 4B refer a neural-network architecture as a part of implementing the RL agent. The same refers a scalable neural-net architecture. The RL Agent is represented by policy network (neural net). Number of users to be scheduled changes every TTI.

FIG. 4a represents a state-of-the-art Neural net that otherwise has a fixed-number of inputs. The state of the art neural-net architecture is not easily scalable, computationally intensive and not easy to parallelize. once may define maximum users and fix the size of the input layer to that value, but such architecture exhibits more space and time complexity as well as more training and evaluation time.

FIG. 4b illustrates a neural network architecture employed in accordance with the present disclosure. In accordance with the present neural-network architecture, policy network is designed to be independent of the number of users (n). The same policy network is used to compute scheduling probability of users, for example, by applying Softmax on n outputs. Computational complexity is very less as neural-net is very small. Overall, the present architecture is scalable with number of flows/UEs, computationally efficient and easily parallelizable.

Figure 5:
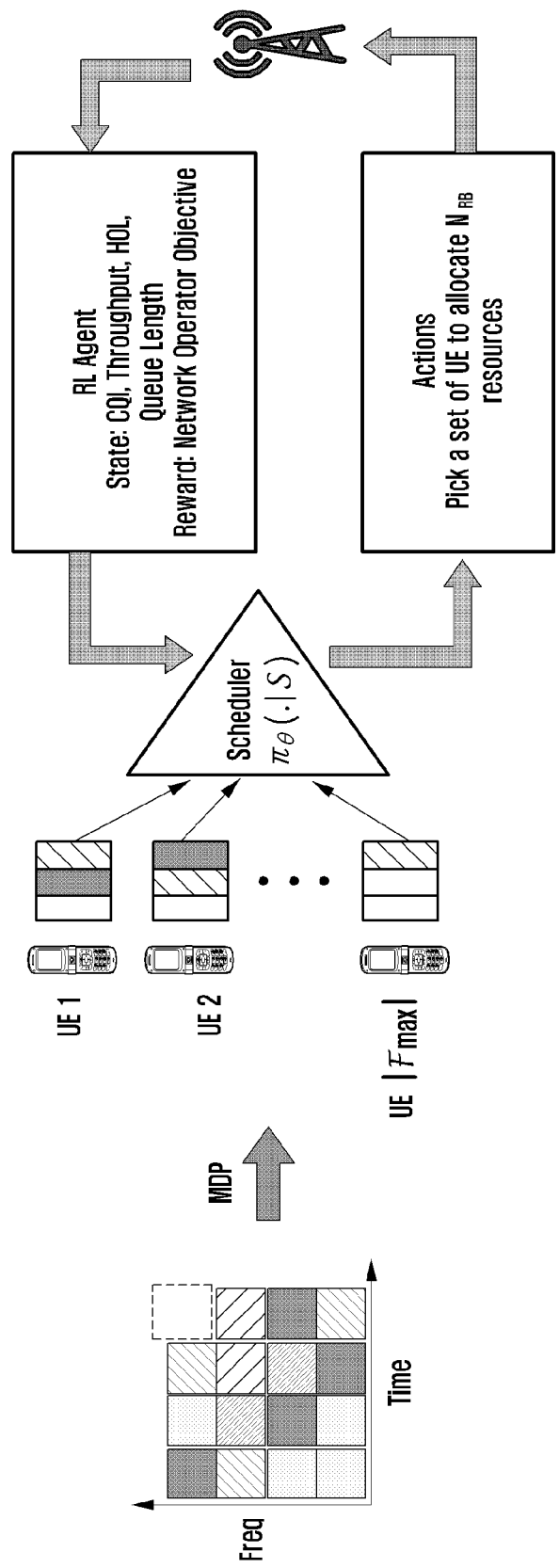
FIG. 5 illustrates an overall telecommunication system wherein a base station incorporates and scheduler and the RL agent in accordance with an embodiment of the present disclosure.

FIG. 5 refers an overall telecommunication system wherein a base station incorporates and scheduler and the RL agent.

At step 502 the base station prepares a list of all active bearers or UEs corresponding to step 202.

At step 504, the base station executes state preparation per active flow corresponding to step 204 and 206. The state is composed of parameters such as CQI, delay, etc.

At step 506, the RL agent which is represented by the neural network decides whom to allocate resources corresponding to step 208. NN represents policy function. The output may be list of bearers which may be scheduled finally At step 508, an actual resource allocation is done by the scheduler corresponding to step 210. RBs are allocated to the selected bearers in Step 506.

The aforementioned architecture refers to radio-resource schedulers in 4G/5G/6G base station using reinforcement learning (RL) for providing a tunable control to operators for balancing their desired objectives: The same at least aims at minimizing packet loss ratio within packet-delay budget, maximizing throughput and fairness. The reward functions are designed and form a key part of the RL agent to achieves the balance of the desired objectives and adapts to system changes faster. Further, low complex and scalable neural net architecture scales with number of users in the system.

Scheduling does not have fixed input-output solutions. The scheduling problem is a decision-making problem and accordingly is facilitated by reinforcement learning which is a class of problems where an agent has to decide an environment. Reinforcement Learning based algorithms adapt to the environment. RL agent assists in scheduling where the environment is stochastic and dynamic.

Further, the present system as shown in FIG. 5 may be implemented as vRAN systems. The availability of GPU's in vRAN systems makes the learning real-time and fast. Scheduling for a set of cells in a vRAN system achieves increased data set and better balancing. As vRAN systems can have a scalable number of GPUs, the RL agent may easily utilize GPU cores for accelerated computations which are available in vRAN system as the neural network is designed to be scalable (and tuned for GPU kind of operation) and individual units can be processed independently (on multiple GPUs).

Real-time learning possible in vRAN systems and may execute in parallel by configuring dedicated GPU's in vRAN system (leading to higher adaptability and efficiency) as compared to constrained conventional fixed HW based system. The reward mechanism may be controlled.

In example, distributed RL agent may be used in vRAN systems to dedicate independent resources for parallel training. Since RL agent is scalable with resources, this enables learning efficiently and exhaustively. Multi-cell scheduling can be targeted on VRAN systems. Accordingly, the RL approach facilitates holistic scheduling in multi-cell scenarios.

More specifically concerning multi-cell scheduling, distributed RL during training improve the learning speed. Utilizing parallel cores for distributed RL framework expedites the learning process. Multiple instances of vRAN (docker's/pod's) help in holistic scheduling. Multiple cell data is assimilated for efficient scheduling of resources in neighboring cells. RL agents can monitor multiple instances or scenarios or cell's data and can be trained for optimized-solution. Likewise, the reinforcement ML network may be construed to be implemented as a part of cloud RAN (cRAN) and open RAN (oRAN).

Figure 6:
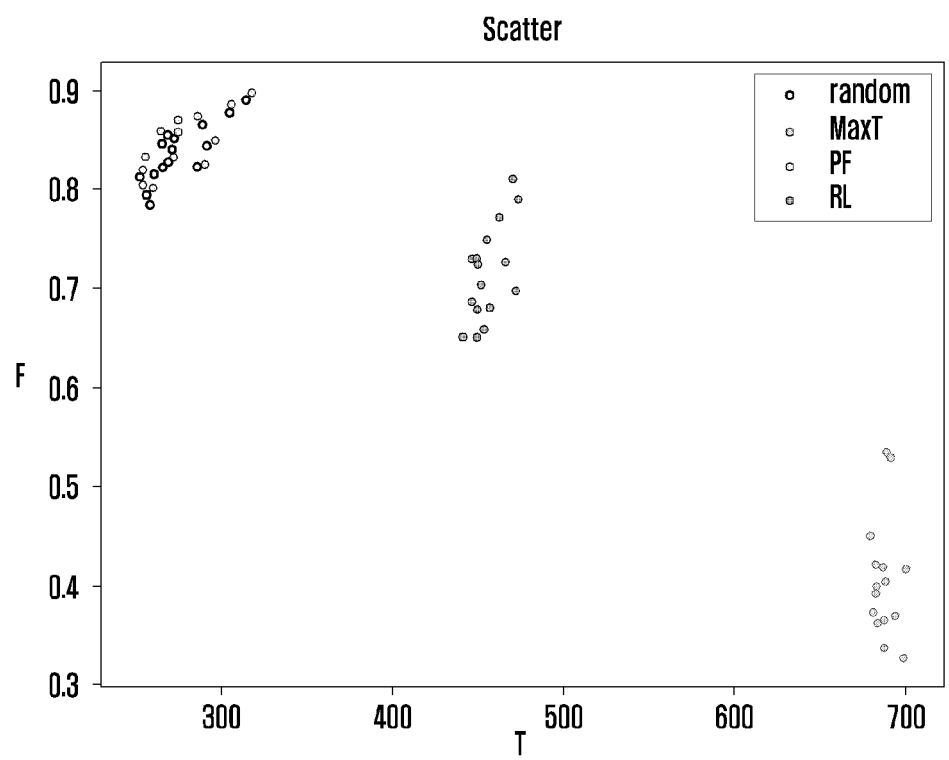
FIG. 6 illustrates selection of a high level objective in accordance with an embodiment of the present disclosure.

FIG. 6 refers selection of throughput and fairness as high-level objective. The reward may be represented as follows:

$$\text{Reward}: R_t = T^{0.5} * F^{0.5}, \text{ wherein}$$

fairness index is used as fairness-measure.

As a part of results, the maximum throughput TPT (MT) scheduler exhibits one or more of the following features:
a) assignment of best CQI;
b) best TPT but low and scattered fairness values;
c) random scheduler;
d) very high fairness but TPT is lower to mobile terminating (MT);
e) proportional fairness scheduler;
f) assigns based on PF metric; or
g) high fairness, TPT higher than random but lower than MT.

Figure 7A:
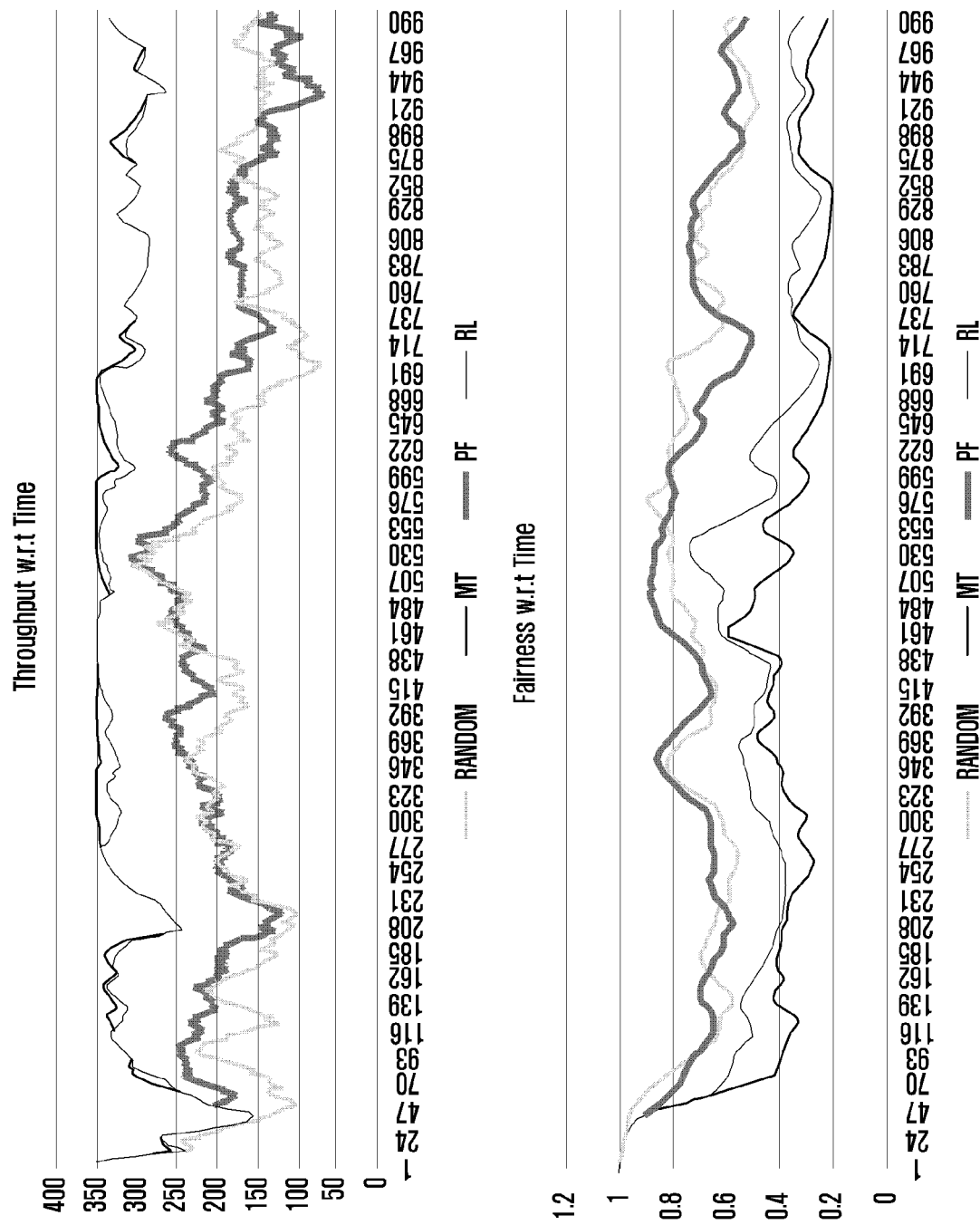
FIGS. 7A to 7C illustrate a trade-off between throughput and fairness objective in accordance with an embodiment of the present disclosure.
Figure 7B:
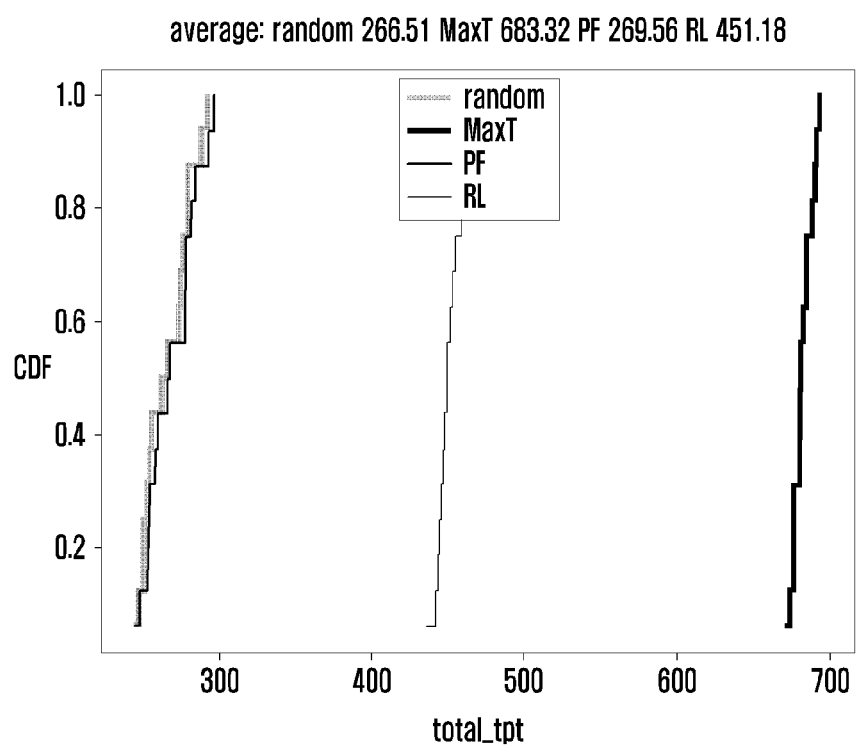
Figure 7C:
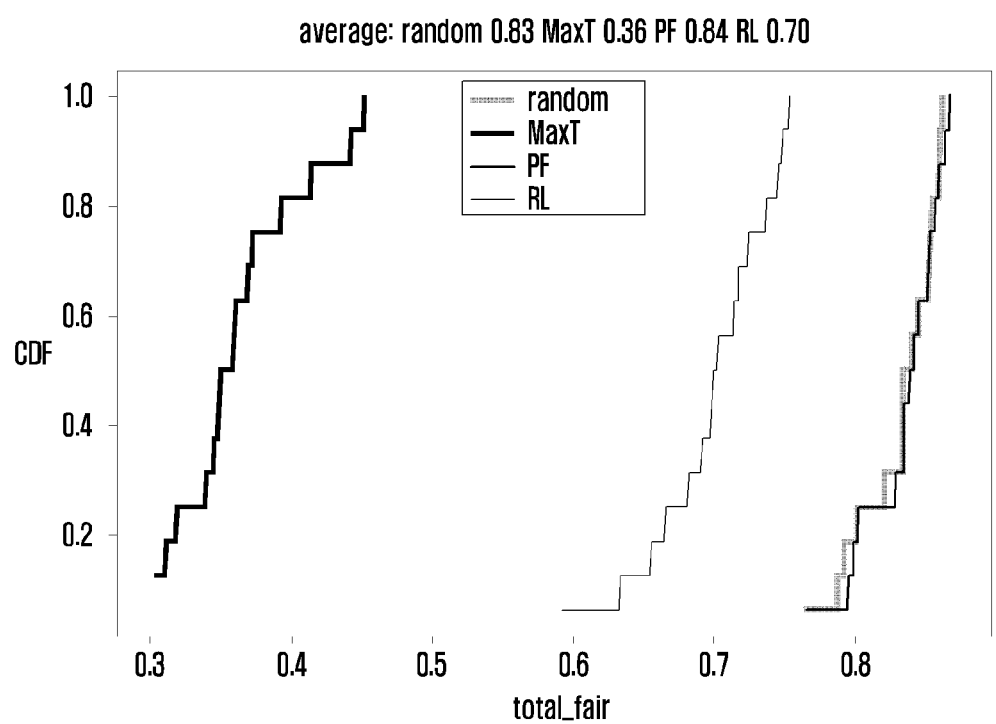
Figure 8A:
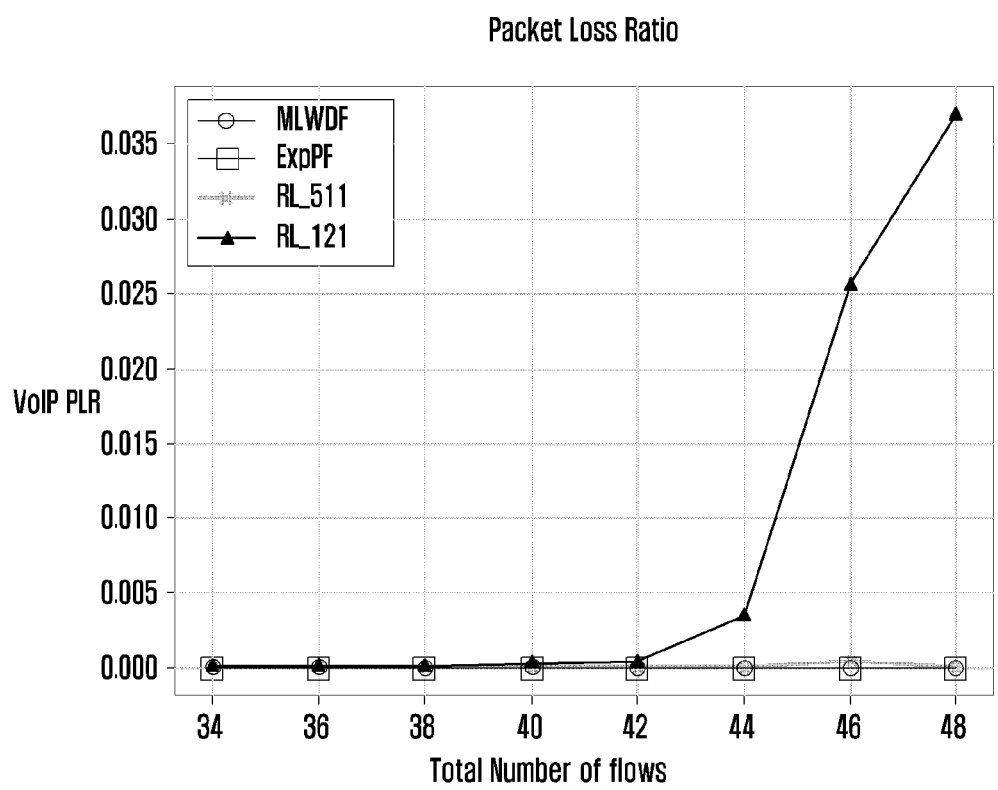
FIGS. 8A to 8D illustrate RL scheduler achieving throughput, QoS & Fairness in accordance with an embodiment of the present disclosure.
Figure 8B:
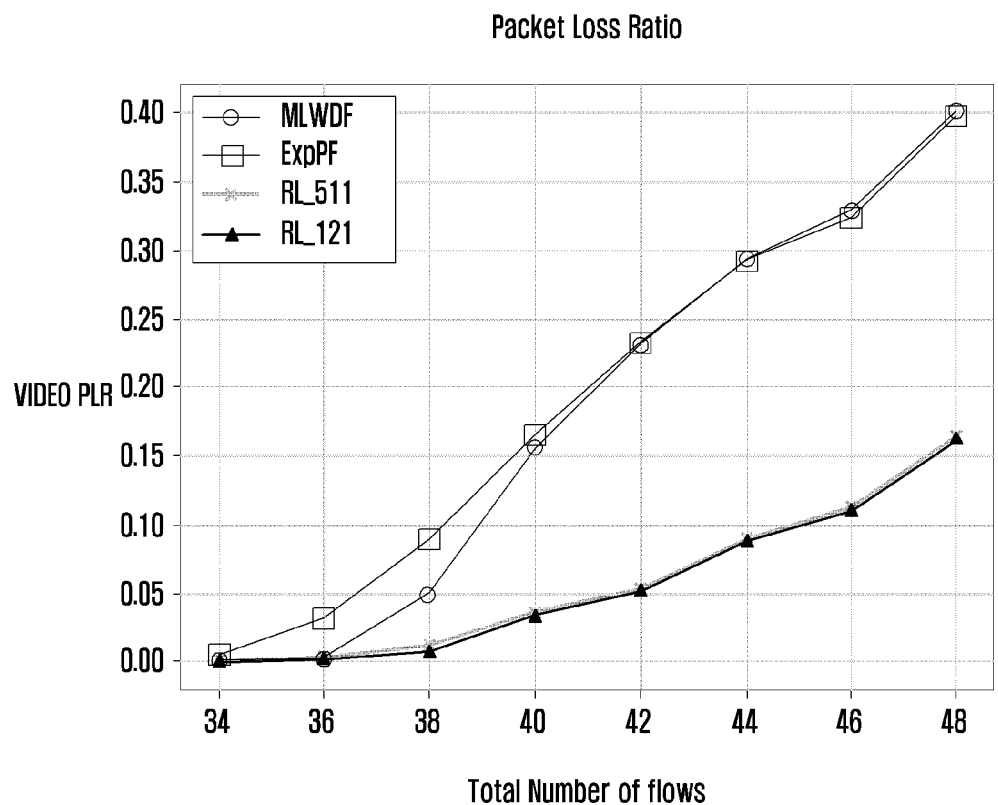
Figure 8C:
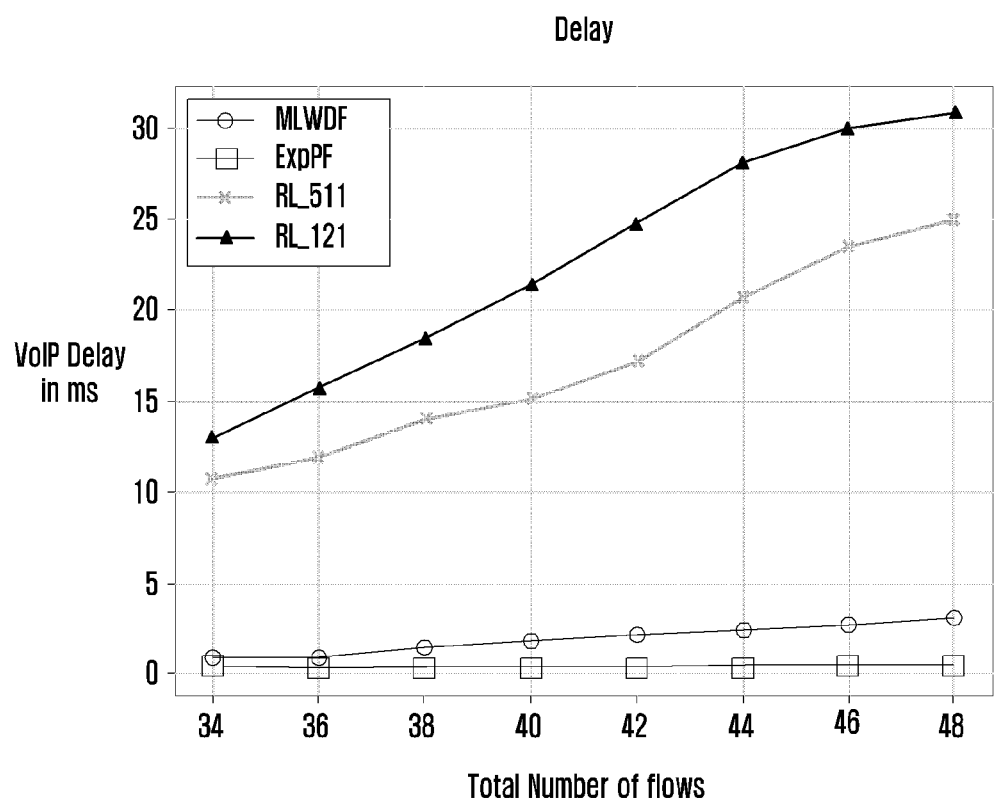
Figure 8D:
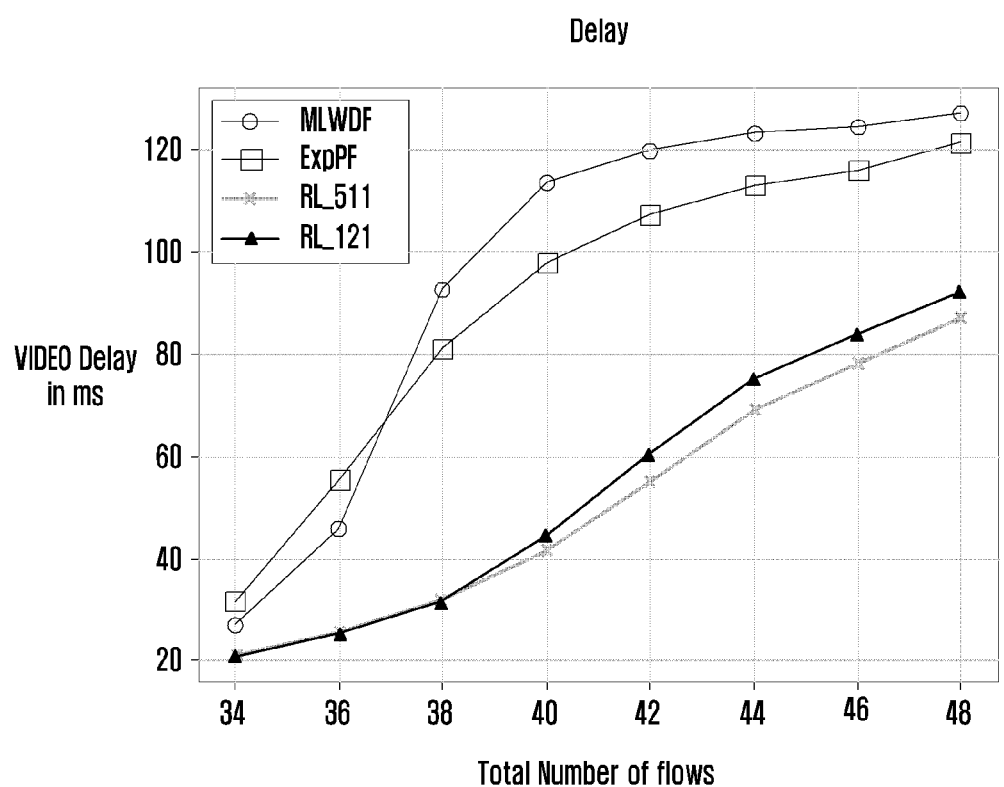
Figure 9A:
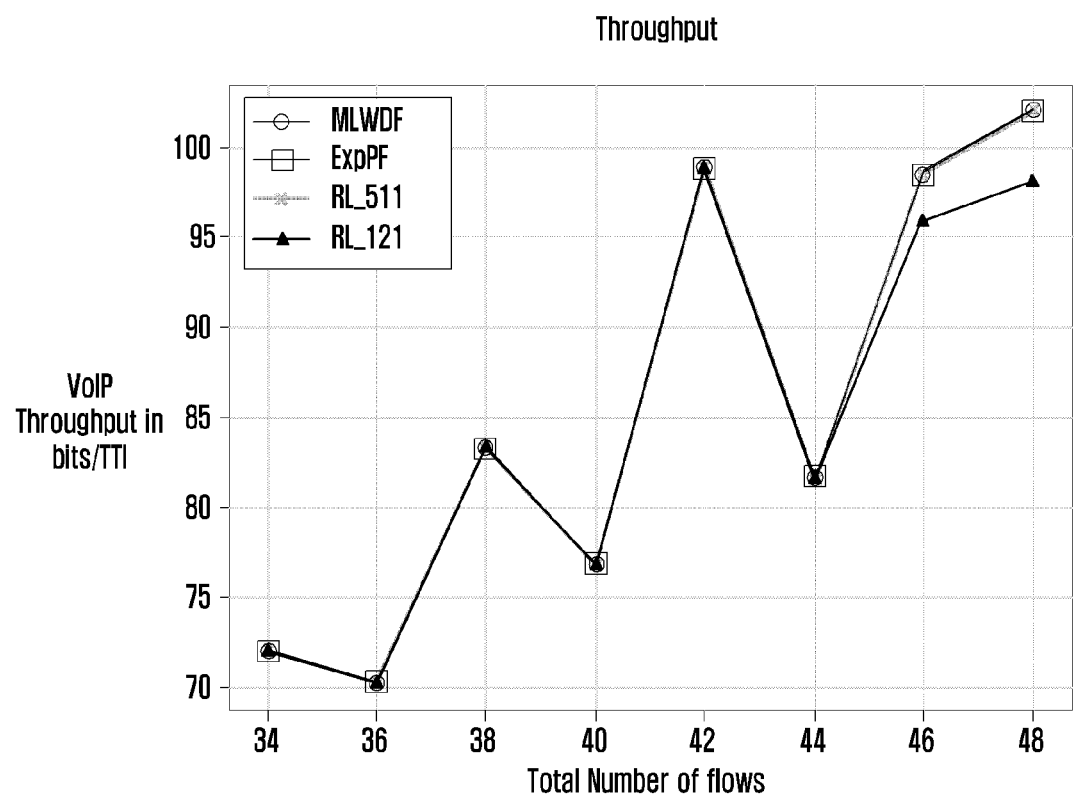
FIGS. 9A to 9D illustrates a time complexity analysis of scheduler in accordance with an embodiment of the present disclosure.
Figure 9B:
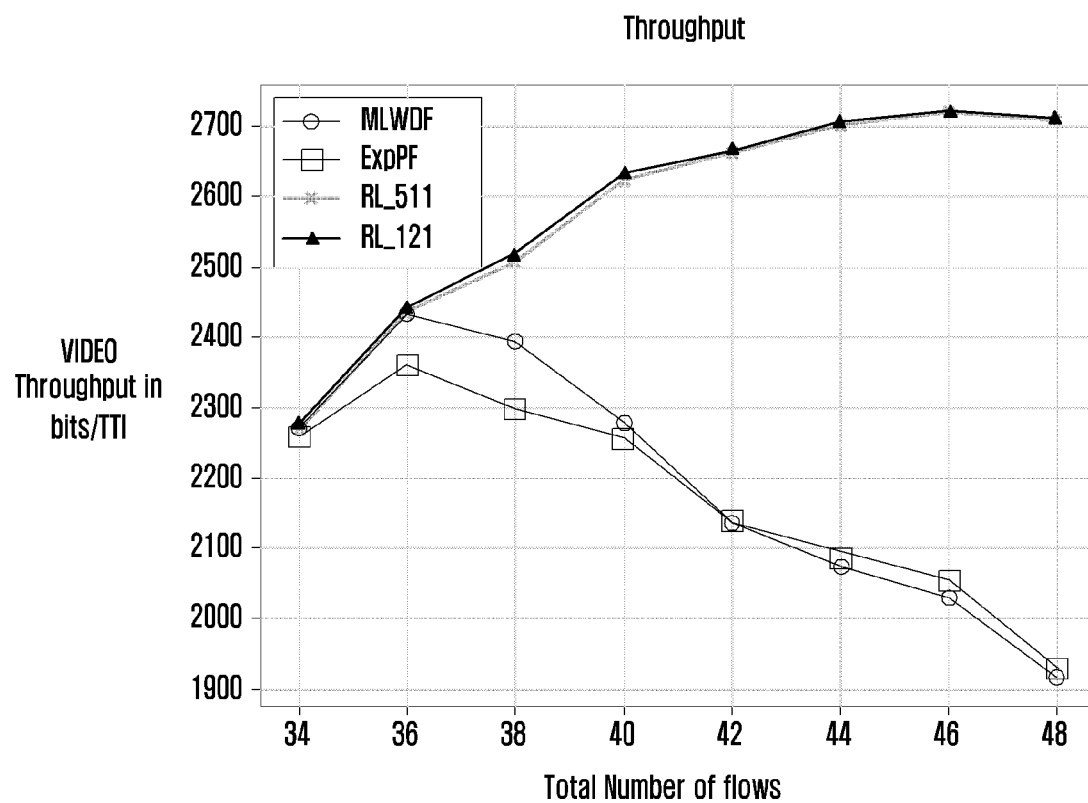
Figure 9C:
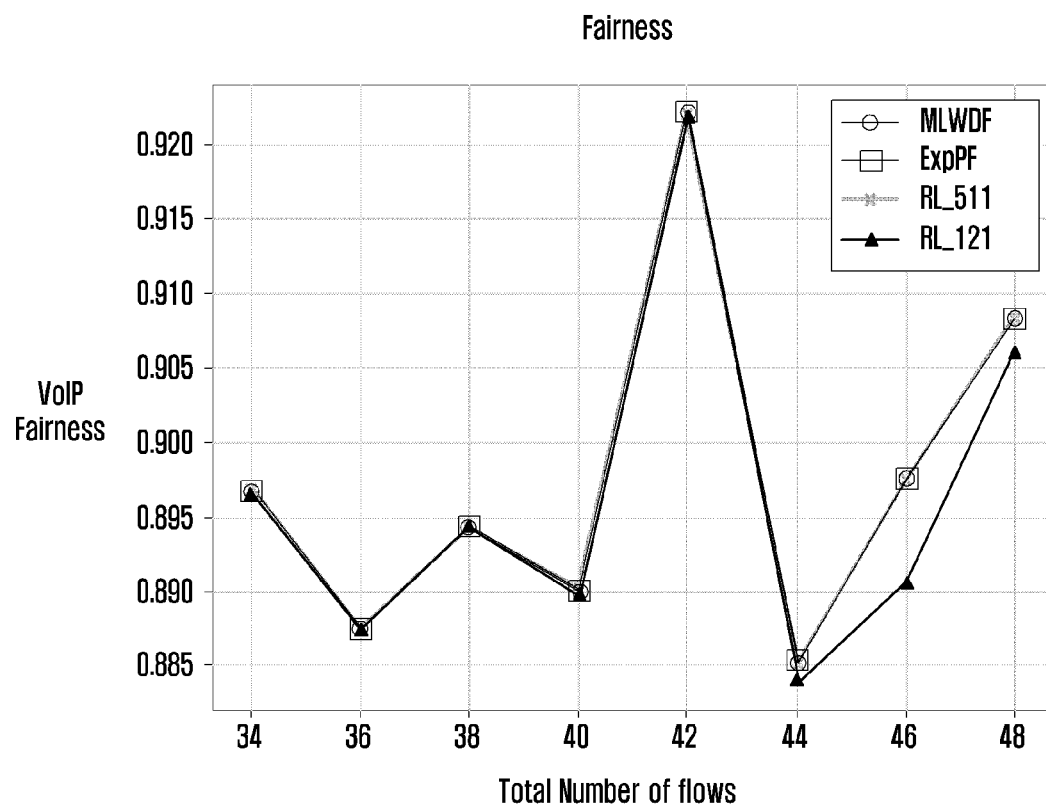
Figure 9D:
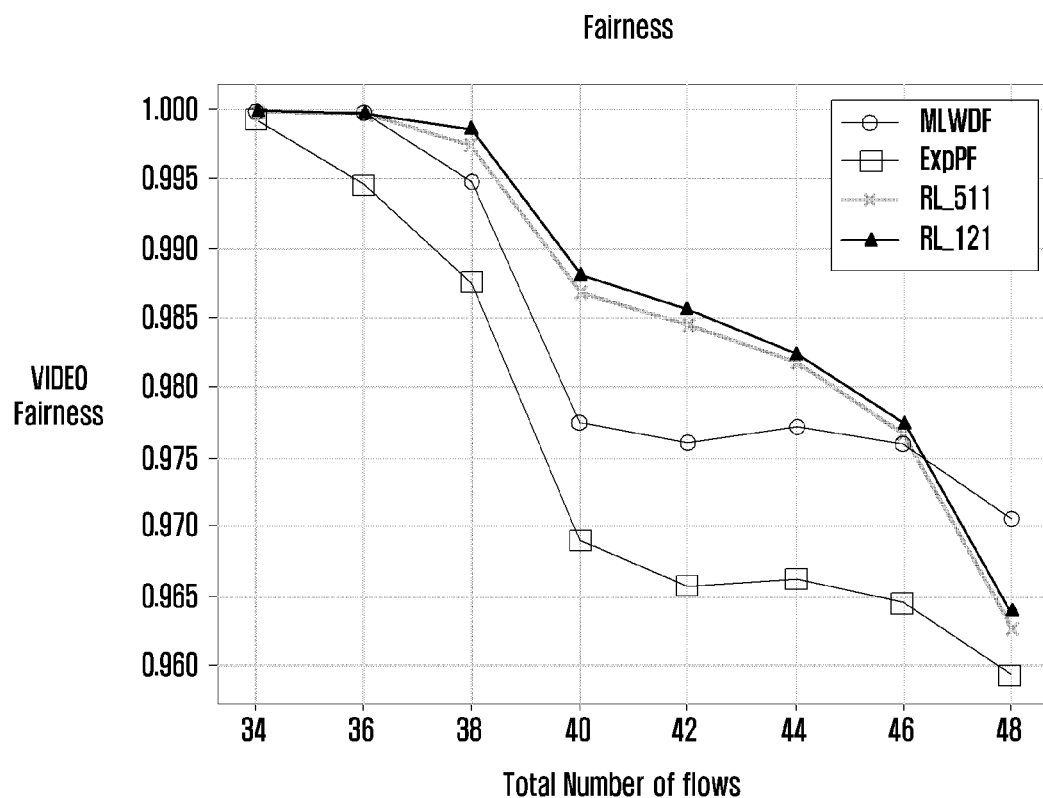

FIGS. 7A to 7C refer a trade-off between throughput and fairness by the RL scheduler.

FIG. 8A to 8D refer to RL Scheduler achieving throughput, QoS & Fairness. The QoS enhancement for Delay and PLR is defined by a state-space in turn defined by one or more of:
average delay ($\lambda_i$);
average past throughput ($T_i$);
head of line delay ($D_i$);
achievable throughput ($R_i$); or
average Packet loss ratio ($\overline{L}_i$).

The action space may be defined as a set of active users. Schedule resource block to user. The algorithm may be defined as reinforce policy gradient. The reward details may be defined as follows:
simulations are being carried out in both LTE-Sim as well as custom environment;
TB is maximum TB size for LTE for single RB;
F is Jain fairness index; and
B is Buffer Occupancy and p is priority of the flow type. There are two RL agents which are of the following configurations:
RL511: VoIP priority=5 and Video Priority=1; and
RL121: VoIP priority=1 and Video Priority=2.

FIG. 9A to 9D refers time complexity analysis of scheduler. A trained neural net feedforward complexity may be defined as:
feedforward is just a matrix multiplication;
let say, matrix A (n by m) is multiplied with B (m by p). Time complexity for this is O(n*m*p), where O(.) is a big O notation;
the current neural net is having one input layer (2 neurons), two hidden layers (32 and 16 neurons), and one output (1 neuron) layer;
scheduler environment parameters;
one resource block;
total number of UE's (n) at a given TTI;
input matrix is of n by 2 dimensions, where 2 is the state dimension; and
current time complexity: n * [O(32*2)+O(32)+O(32*16)+O(16)] per RB.
Effectively, it comes out to be O(n). Neural net's dimension is fixed in runtime.

At least in view of the aforesaid features, the present disclosure's reinforcement learning agent achieves the "configured" balance of the above objectives. Allocation of resources to user flows based on various system and radio parameters state. The same offers simple (computation) yet efficient reward function design. Further, adjustment of the resource allocation strategy based on the reward.

The present disclosure scheduler achieves better performance (than traditional schedulers) in achieving a balance of the configured multiple objectives such as throughput (per user, system), QoS requirements for each user flow, fairness (among the user flows).

The present disclosure's scheduler is adaptable for achieving the desired balance in varying operating conditions, Varying Radio Conditions, varying Traffic Conditions & the number of user flows, which was the major drawback of static heuristics based traditional schedulers.

The present disclosure renders a low computational complexity and a scalable design of neural net that maintains low complexity while scaling the number of flows.

The neural net ML mechanism underlying the present disclosure may be remotely accessible and cloud-based, thereby being remotely accessible through a network connection. An audio/video processing device may be configured for remotely accessing the NLP/ML modules and simulation modules may comprise skeleton elements such as a microphone, a camera a screen/monitor, a speaker etc.

Further, at least one of the plurality of modules of mesh-network may be implemented through AI based on an ML logic. A function associated with AI may be performed through the non-volatile memory, the volatile memory, and the processor constituting the first hardware module i.e., specialized hardware for ML based mechanisms. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The aforesaid processors collectively correspond to the processor of FIG. 10.

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning logic/technique to a plurality of learning data, a predefined operating rule or AI model of the desired characteristic is made. "Obtained by training" means that a predefined operation rule or artificial intelligence model configured to perform a desired feature (or purpose) is obtained by training a basic artificial intelligence model with multiple pieces of training data by a training technique. The learning may be performed in a device itself in which AI according to an embodiment is performed, and/or may be implemented through a separate server/system.

The AI model may consist of a plurality of neural network layers. Each layer has a plurality of weight values and performs a neural network layer operation through calculation between a result of computation of a previous-layer and an operation of a plurality of weights. Examples of neural-networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The ML logic is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

Figure 10:
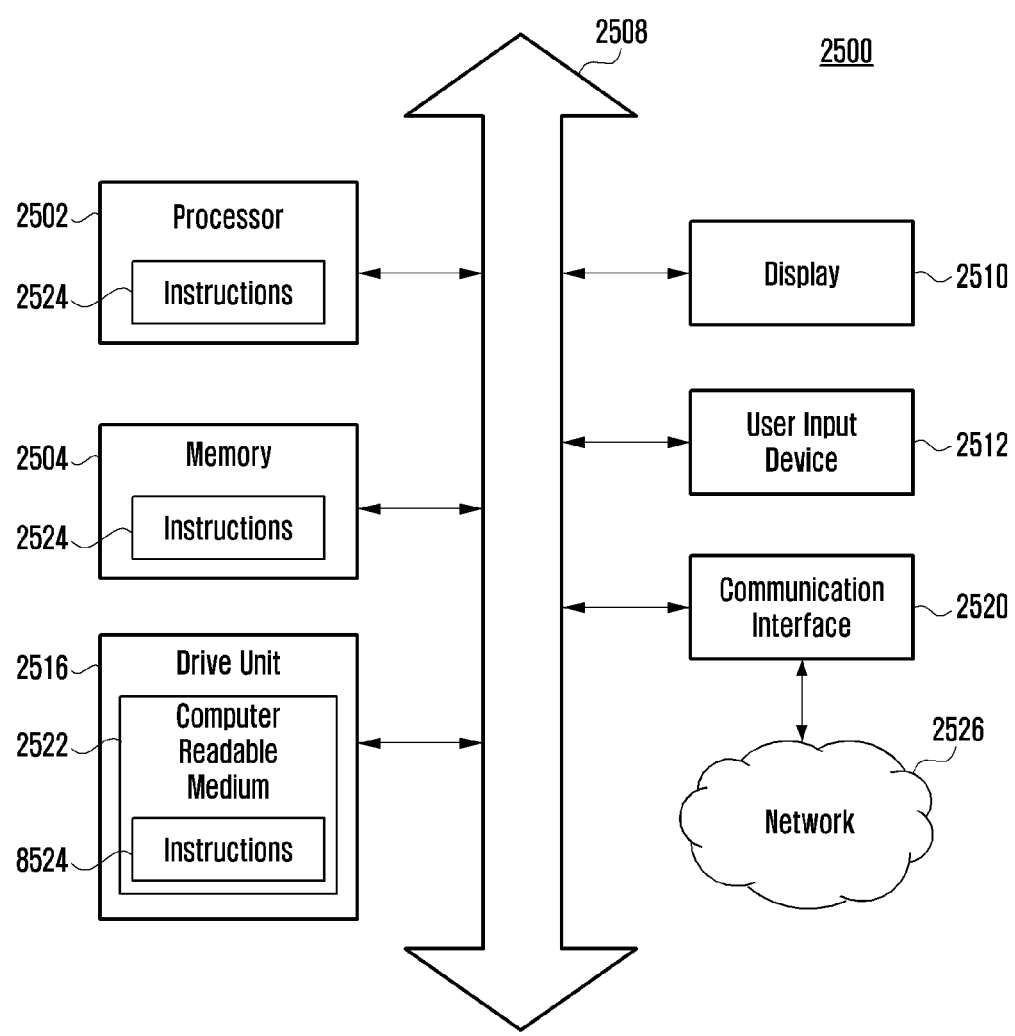
FIG. 10 illustrates a typical hardware configuration of the base station and UE in the form of a computer system scheduler in accordance with an embodiment of the present disclosure.

FIG. 10 shows yet another exemplary implementation in accordance with the embodiment of the disclosure, and yet another typical hardware configuration of the base station and UE in the form of a computer system 2500. The computer system 2500 can include a set of instructions that can be executed to cause the computer system 2500 to perform any one or more of the methods disclosed. The computer system 2500 may operate as a standalone device or may be connected, e.g., using a network, to other computer systems or peripheral devices.

In a networked deployment, the computer system 2500 may operate in the capacity of a server or as a client user computer in a server-client user network environment, or as a peer computer system in a peer-to-peer (or distributed) network environment. The computer system 2500 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 2500 is illustrated, the term "system" may also be taken to include any collection of systems or sub-systems that individually or jointly execute a set, or multiple sets, of instructions to perform one or more computer functions.

The computer system 2500 may include a processor 2502 e.g., a central processing unit (CPU), a graphics processing unit (GPU), or both. The processor 2502 may be a component in a variety of systems. For example, the processor 2502 may be part of a standard personal computer or a workstation. The processor 2502 may be one or more general processors, digital signal processors, application-specific integrated circuits, field-programmable gate arrays, servers, networks, digital circuits, analog circuits, combinations thereof, or other now known or later developed devices for analyzing and processing data. The processor 2502 may implement a software program, such as code generated manually (i.e., programmed).

The computer system 2500 may include a memory 2504, such as a memory 2504 that can communicate via a bus 2508. The memory 2504 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 2504 includes a cache or random access memory for the processor 2502. In alternative examples, the memory 2504 is separate from the processor 2502, such as a cache memory of a processor, the system memory, or other memory. The memory 2504 may be an external storage device or database for storing data. The memory 2504 is operable to store instructions executable by the processor 2502. The functions, acts or tasks illustrated in the figures or described may be performed by the programmed processor 2502 for executing the instructions stored in the memory 2504. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 2500 may or may not further include a display unit 2510, such as a liquid crystal display (LCD), an organic light-emitting diode (OLED), a flat panel display, a solid-state display, a cathode ray tube (CRT), a projector, a printer or other now known or later developed display device for outputting determined information. The display 2510 may act as an interface for the user to see the functioning of the processor 2502, or specifically as an interface with the software stored in the memory 2504 or the drive unit 2516.

Additionally, the computer system 2500 may include an input device 2512 configured to allow a user to interact with any of the components of system 2500. The computer system 2500 may also include a disk or optical drive unit 2516. The disk drive unit 2516 may include a computer-readable medium 2522 in which one or more sets of instructions 2524, e.g., software, can be embedded. Further, the instructions 2524 may embody one or more of the methods or logic as described. In a particular example, the instructions 2524 may reside completely, or at least partially, within the memory 2504 or within the processor 2502 during execution by the computer system 2500.

The present disclosure contemplates a computer-readable medium that includes instructions 2524 or receives and executes instructions 2524 responsive to a propagated signal so that a device connected to a network 2526 can communicate voice, video, audio, images, or any other data over the network 2526. Further, the instructions 2524 may be transmitted or received over the network 2526 via a communication port or interface 2520 or using a bus 2508. The communication port or interface 2520 may be a part of the processor 2502 or maybe a separate component. The communication port 2520 may be created in software or maybe a physical connection in hardware. The communication port 2520 may be configured to connect with a network 2526, external media, the display 2510, or any other components in system 2500, or combinations thereof. The connection with the network 2526 may be a physical connection, such as a wired Ethernet connection or may be established wirelessly as discussed later. Likewise, the additional connections with other components of the system 2500 may be physical or may be established wirelessly. The network 2526 may alternatively be directly connected to the bus 2508.

The network 2526 may include wired networks, wireless networks, Ethernet AVB networks, or combinations thereof. The wireless network may be a cellular telephone network, an 802.11, 802.16, 802.20, 802.1Q or WiMax network. Further, the network 826 may be a public network, such as the Internet, a private network, such as an intranet, or combinations thereof, and may utilize a variety of networking protocols now available or later developed including, but not limited to TCP/IP based networking protocols. The system is not limited to operation with any particular standards and protocols. For example, standards for Internet and other packet-switched network transmissions (e.g., TCP/IP, UDP/IP, HTML, and HTTP) may be used.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to the problem and any component(s) that may cause any benefit, advantage, or solution to occur or become more pronounced are not to be construed as a critical, required, or essential feature or component of any or all the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for radio-resource scheduling in a telecommunication network, the method comprising:
   selecting at least one objective associated with a radio-resource scheduling from a plurality of objectives;
   prioritizing at least one flow from a plurality of flows for the selected at least one objective;
   identifying at least one state parameter from a plurality of state parameters associated with at least one of active bearers from a plurality of active bearers;
   inputting the at least one of the plurality of state parameters for the at least one of the active bearers to be scheduled during a current transmission time interval (TTI) to a reinforcement machine learning (ML) network, the reinforcement ML network being configured for a reward in accordance with the selected at least one objective; and
   receiving, from the reinforcement ML network, a radio resource allocation for each of the active bearers for the current TTI.

2. The method as claimed in claim 1, wherein the reinforcement ML network is configured for training in accordance with the selected at least one objective and an optional prioritization based on inputting the identified at least one state parameter for the active bearer acting as a training dataset.

3. The method of claim 1, wherein selecting the at least one objective corresponds to a selection of a reward function associated with the reinforcement ML network, selecting the at least one objective being achieved by one or more tunable parameters for a plurality of reward functions.

4. The method of claim 3, wherein the plurality of reward functions is defined by one or more of: throughput and fairness with variable proportions;
   maximizing throughput and minimizing packet loss ratio (PLR);
   maximizing throughput and minimizing delay;
   minimized delay;
   minimized PLR; or
   maximum throughput.

5. The method of claim 1, wherein the plurality of state parameters corresponds to network parameters comprising one or more of system throughput, user fairness, QoS conformance, total transmission power, maximum achievable transmission rate, past average throughput, queue length, head-of-line delay, packet loss ratio.

6. The method of claim 5, wherein the plurality of state parameters is computed from the network parameters of the active bearers to be scheduled in the TTI for enabling a training of the reinforcement ML network.

7. The method of claim 6, wherein training of the reinforcement ML network is performed in accordance with the selected at least one objective, prioritization, and the identified at least one state parameter for n number of TTI' s.

8. The method of claim 7, wherein training of the reinforcement ML network includes outputting of a scheduling probability of each of the at least one of the active bearers in the TTI in accordance with a state computed from the at least one of the plurality of state parameters.

9. The method of claim 1, wherein inputting the at least one of the plurality of state parameters comprises passing the at least one of the plurality of state parameters of the active bearers to be scheduled in the current TTI to the reinforcement ML network.

10. The method of claim 1, wherein the radio resource allocation corresponds to selecting the active bearers to be scheduled in the current TTI by a Markov decision process in a cellular environment for the active bearers.

11. A radio-resource scheduler in a telecommunication network, the radio-resource scheduler comprising:
    a reinforcement machine learning (ML) network; and
    a processor operably connected to the ML network, the processor configured to:
      select at least one objective associated with a radio-resource scheduling from a plurality of objectives;
      prioritize at least one flow from a plurality of flows for the selected at least one objective;
      identify at least one state parameter from a plurality of state parameters associated with at least one of active bearers from a plurality of active bearers;

input the at least one of the plurality of state parameters for the at least one of the active bearers to be scheduled during a current transmission time interval (TTI) to the reinforcement machine learning (ML) network, the reinforcement ML network being configured for a reward in accordance with the selected at least one objective; and receive, from the reinforcement ML network, a radio resource allocation for each of the active bearers for the current TTI.

12. The radio-resource scheduler as claimed in claim 11, wherein the reinforcement ML network is configured for training in accordance with the selected at least one objective and an optional prioritization based on inputting the identified at least one state parameter for the active bearer acting as a training dataset.

13. The scheduler as claimed in claim 11, wherein the selection of the at least one objective corresponds to a selection of a reward function associated with the reinforcement ML network, the selection of the at least one objective being achieved by one or more tunable parameters for a plurality of reward functions.

14. The scheduler as claimed in claim 13, wherein the plurality of state parameters is computed from network parameters of the active bearers to be scheduled in the TTI for enabling a training of the reinforcement ML network.

15. The scheduler as claimed in claim 14, wherein the training of the reinforcement ML network is performed in accordance with the selected at least on objective, prioritization, and the identified at least one state parameter for n number of TTI' s.

16. The scheduler as claimed in claim 11, wherein the radio resource allocation corresponds to the selection of the active bearers to be scheduled in the current TTI by a Markov decision process in a cellular environment for the active bearers.

17. The scheduler as claimed in claim 11, wherein the reinforcement ML network is an artificial neural network (ANN) based deep learning network configured to handle a variation of users with every TTI, the ANN being configured independent of a number of users and configured to compute a scheduling probability for a number of users irrespective of variation in the number of users.

18. The scheduler as claimed in claim 11, wherein the training of reinforcement ML network is defined by a real-time learning operation in a virtualized radio access network (vRAN) system, the real-time learning operation determined by (i) configuring the reinforcement ML network in a parallel into one or more graphic processing units (GPUs) in a control unit (CU), a digital unit (DU), and a radio unit (RU) within the vRAN system; and collecting multiple cells data based on monitoring the multiple cells for scheduling of resources in neighbouring cells to achieve a multi-cell scheduling on the vRAN system.

19. A radio-resource scheduler in a telecommunication network, the radio-resource scheduler comprising:
a pre-trained reinforcement machine learning (ML) network; and
a processor operably connected to the pre-trained reinforcement ML network, the processor configured to:
deploy the pre-trained reinforcement ML network in a communication network,
receive, by a network operator, at least one objective associated with a radio-resource scheduling to operate the pre-trained reinforcement ML network,
prioritize, by the network operator, at least one flow from a plurality of flows for the at least one objective,
identify at least one state parameter from a plurality of state parameters associated with at least one of active bearers from a plurality of active bearers,
inputting at least one of the plurality of state parameters for the at least one of active bearers to be scheduled during a current transmission time interval (TTI) to the pre-trained reinforcement machine learning (ML) network, and
receive, from the pre-trained reinforcement ML network, a radio resource allocation for each of the active bearers for the current TTI.

20. The radio-resource scheduler of claim 19, wherein the processor is further configured to:
identify at least one of a plurality of bearers in relation to a specific transmission time interval (TTI);
identify at least one of network parameters associated with the at least one of the plurality of bearers;
analyse, based on the pre-trained reinforcement ML network, the at least one of the network parameters and the associated at least one of the plurality of bearers; and
receive, from the network operator, the selected at least one objective associated with a radio-resource scheduling to operate the pre-trained reinforcement ML network.

* * * * *